Patented Feb. 9, 1932

1,844,287

UNITED STATES PATENT OFFICE

HENRY EDWARD KEHDER, OF HUEY, ILLINOIS, ASSIGNOR OF ONE-HALF TO EDWARD MAT PELZER, OF ST. LOUIS, MISSOURI

SOLDER

No Drawing. Application filed April 9, 1931. Serial No. 528,989.

The object of my invention is to make a solder. A more specific object is to provide means for making a solder, particularly to be used for soldering aluminum, either to aluminum or to some other metal.

Still more specific objects are to provide a method of making a solder of the type described, which will produce a joint, which is as strong in tension and compression as the original metals.

With these and other objects in view, my invention has relation to certain novel features and method of production, which will be hereinafter more fully described and pointed out in the claims. The material used in making my solder, and the proportions used are the following:

Bar tin 8/12 or 2/3,
Nigrosin 1/24,
Yellow dextrin 1/24,
Extract of log wood 1/12,
Soldering paste 2/12 or 1/6.

The proportions are based on weight. The method is the following:

The nigrosin, yellow dextrin, extract of log wood and soldering paste are placed in a container, and thoroughly mixed by stirring. The bar tin is placed in a crucible and heated until the tin is thoroughly melted. The mixture of nigrosin, yellow dextrin, extract of log wood and soldering paste are then added to the melted tin, and the mixture is thoroughly mixed by stirring. When this is done, the surface of the material in the crucible will be enveloped in flames. When the flames burn out, the crucible is removed from the flame, and the material poured into molds. It is necessary that the material be not heated to too great an extent, as such overheating will color the solder and make it too brittle, when finished. In order not to subject the material to too much heat, it is necessary to remove the crucible as soon as the flame on the surface disappears, and not to continue the heating thereafter.

In order to use my solder effectively, the aluminum or metal, that is to be soldered, must be clean. The soldering iron must also be clean. The iron metal surfaces may be effectually cleaned with steel wool, but, under no circumstances, should acid be used for the cleaning process. The soldering iron should be very hot and the solder should be applied to the metal that is to be soldered, with the use of the soldering iron in a conventional way, giving the soldering iron a circular motion in spreading the solder on the metal surfaces.

What I claim is:

A solder composed of 67% by weight of bar tin, 4.2% by weight of nigrosin, 4.2% by weight of yellow dextrin, 8.7% by weight of extract of log wood and 15.9% by weight of soldering paste.

In testimony whereof I affix my signature.

HENRY EDWARD KEHDER.